(12) United States Patent
Maluf et al.

(10) Patent No.: US 10,666,671 B2
(45) Date of Patent: May 26, 2020

(54) DATA SECURITY INSPECTION MECHANISM FOR SERIAL NETWORKS

(71) Applicant: Cisco Technology, Inc., San Jose, CA (US)

(72) Inventors: David A. Maluf, Mountain View, CA (US); Raghuram S. Sudhaakar, Fremont, CA (US); Sanjiv Doshi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 15/497,806

(22) Filed: Apr. 26, 2017

(65) Prior Publication Data

US 2018/0316700 A1     Nov. 1, 2018

(51) Int. Cl.
| | | |
|---|---|---|
| *H04L 29/06* | (2006.01) | |
| *H04L 12/66* | (2006.01) | |
| *H04L 12/40* | (2006.01) | |
| *G06N 5/04* | (2006.01) | |
| *G06N 20/00* | (2019.01) | |

(52) U.S. Cl.
CPC ......... *H04L 63/1425* (2013.01); *G06N 5/046* (2013.01); *H04L 12/40* (2013.01); *H04L 12/66* (2013.01); *G06N 20/00* (2019.01); *H04L 63/145* (2013.01); *H04L 63/1416* (2013.01); *H04L 2012/40215* (2013.01)

(58) Field of Classification Search
CPC ..... H04L 63/1425; H04L 12/66; H04L 67/22; H04L 12/40; H04L 63/145; G06N 99/005
USPC ......................................................... 726/23
See application file for complete search history.

(56) References Cited

U.S. PATENT DOCUMENTS

| | | | |
|---|---|---|---|
| 9,380,070 B1 | 6/2016 | Cain et al. | |
| 9,419,802 B2 | 8/2016 | Lortz et al. | |
| 10,124,750 B2* | 11/2018 | Markham | ............... H04W 4/40 |
| 2008/0086363 A1* | 4/2008 | Kass | ..................... G06Q 10/04 |
| | | | 705/7.29 |
| 2011/0167147 A1* | 7/2011 | Andersson | .......... H04L 43/0858 |
| | | | 709/224 |

(Continued)

FOREIGN PATENT DOCUMENTS

WO     WO-2016009356 A1     1/2016

OTHER PUBLICATIONS

Currie, Roderick., "The Automotive Top 5: Applying the Critical Controls to the Modern Automobile", https://www.sans.org/reading-room/whitepapers/critical/automotive-top-5-applying-critical-controls-modern-automobile-36862, SANS Institute InfoSec Reading Room, 31 pages, 2015, The SANS Institute.

(Continued)

*Primary Examiner* — Jason Chiang
(74) *Attorney, Agent, or Firm* — Behmke Innovation Group LLC; James M. Behmke; James J. Wong

(57) ABSTRACT

In one embodiment, a device in a serial network determines that a suspicious event has occurred in the network. The suspicious event is identified based on timing information for one or more frames in the serial network. The device assesses whether the suspicious event is malicious by evaluating a sequence of events in the network that precede the suspicious event. The device causes a mitigation action to be performed in the network when the suspicious event is deemed malicious.

17 Claims, 7 Drawing Sheets

(56) References Cited

U.S. PATENT DOCUMENTS

| | | | | |
|---|---|---|---|---|
| 2013/0104230 A1* | 4/2013 | Tang | ................ | G06F 21/552 |
| | | | | 726/23 |
| 2013/0338990 A1* | 12/2013 | He | ................ | H04L 41/145 |
| | | | | 703/13 |
| 2015/0020152 A1* | 1/2015 | Litichever | ............ | H04L 63/14 |
| | | | | 726/1 |
| 2016/0188396 A1* | 6/2016 | Sonalker | ............ | G06F 11/0739 |
| | | | | 714/37 |
| 2017/0054751 A1* | 2/2017 | Schneider | ............ | H04L 63/1425 |
| 2018/0046800 A1* | 2/2018 | Aoki | ............ | G06F 21/56 |
| 2018/0316700 A1* | 11/2018 | Maluf | ............ | H04L 63/1425 |

OTHER PUBLICATIONS

Zeng, et al., "Stochastic Analysis of CAN-Based Real-Time Automotive Systems", IEEE Transactions on Industrial Informatics ( vol. 5, Issue: 4, Nov. 2009 ), pp. 388-401, Sep. 2009, IEEE.

Kallel et al. "Modeling and Evaluating a CAN Controller Components Using Stochastic and Colored Petri Nets" pp. 1-11.

Cisco Data in Motion; Cisco DevNet: DMO—Overview; https://developer.cisco.com/site/data-in-motion/discover/overview . . . ; pp. 1-3.

Cisco Data in Motion Getting Started Guide; https://developer.cisco.com/site/data-in-motion/discover/getting-started- . . . ; Cisco DevNet: DMO—Getting Started Guide; pp. 1-11.

\* cited by examiner

DATA SECURITY INSPECTION MECHANISM FOR SERIAL NETWORKS

TECHNICAL FIELD

The present disclosure relates generally to computer networks, and, more particularly, to a data security inspection mechanism for serial networks.

BACKGROUND

Serial networks are in wide use today across a number of industries. For example, many transportation vehicles today use Controller Area Network Bus (CAN Bus) networks, to convey messages between the different components of a vehicle (e.g., the transmission, brakes, windshield wipers, etc.).

Despite the prevalence of serial networks, most serial networks lack any security paradigm at all. For example, in the case of CAN Bus today, any device can be easily connected to the network without any authentication or authorization at all. Full-fledged authentication and authorization techniques, such as 802.11x, are also too expensive and time consuming to run on a CAN Bus network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a serial network determines that a suspicious event has occurred in the network. The suspicious event is identified based on timing information for one or more frames in the serial network. The device assesses whether the suspicious event is malicious by evaluating a sequence of events in the network that precede the suspicious event. The device causes a mitigation action to be performed in the network when the suspicious event is deemed malicious.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. For example, the Internet may be viewed as a WAN that uses the Internet Protocol (IP) for purposes of communication.

Serial networks are another type of network, different from an IP network, typically forming a localized network in a given environment, such as for automotive or vehicular networks, industrial networks, entertainment system networks, and so on. For example, those skilled in the art will be familiar with the on-board diagnostics (OBD) protocol (a serial network which supports a vehicle's self-diagnostic and reporting capability, including the upgraded "OBD II" protocol), the controller area network (CAN) bus (or CAN BUS) protocol (a message-based protocol to allow microcontrollers and devices to communicate with each other in applications without a host computer), and the MODBUS protocol (a serial communications protocol for use with programmable logic controllers, such as for remote terminal units (RTUs) in supervisory control and data acquisition (SCADA) systems). Unlike an IP-based network, which uses a shared and open addressing scheme, a serial communication network generally is based on localized and proprietary communication standards, where commands or data are transmitted based on localized device identifiers, such as parameter identifiers (PIDs), localized station addresses, and so on.

Figure 1A:
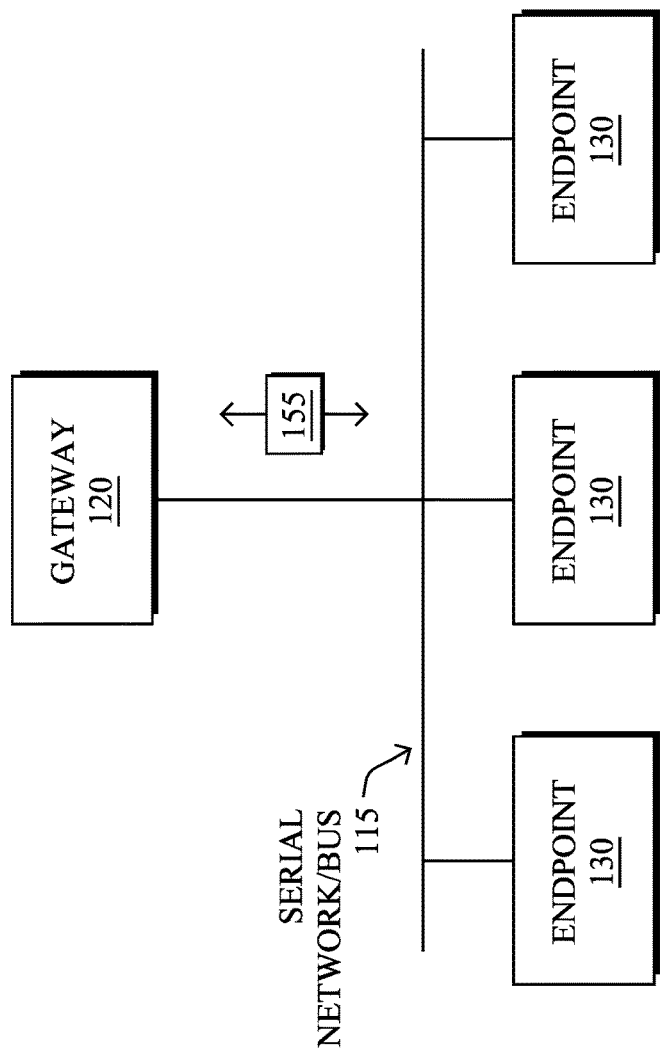
FIGS. 1A-1B illustrate an example communication system.

FIG. 1A illustrates an example communication system 100 illustratively comprising a serial network/bus 115, along with a gateway device (or other network device) 120 interconnecting the serial network/bus 115 with one or more other external networks. Serial network/bus 115, in particular, illustratively comprises one or more endpoints 130 (e.g., a set of one or more controlled devices, sensors, actuators, controllers, processors, and so on), such as part of a vehicular network, an industrial network, etc. The endpoints may be interconnected by various methods of serial communication. For instance, the serial network/bus 115 may allow the endpoints 130 to communicate serial data 155 (e.g., commands, sensor data, etc.) using predefined serial network communication protocols (e.g., OBD, CAN Bus, MODBUS, etc.). In this context, a serial network protocol consists of a set of rules defining how the endpoints interact within the serial network/bus 115.

Figure 1B:
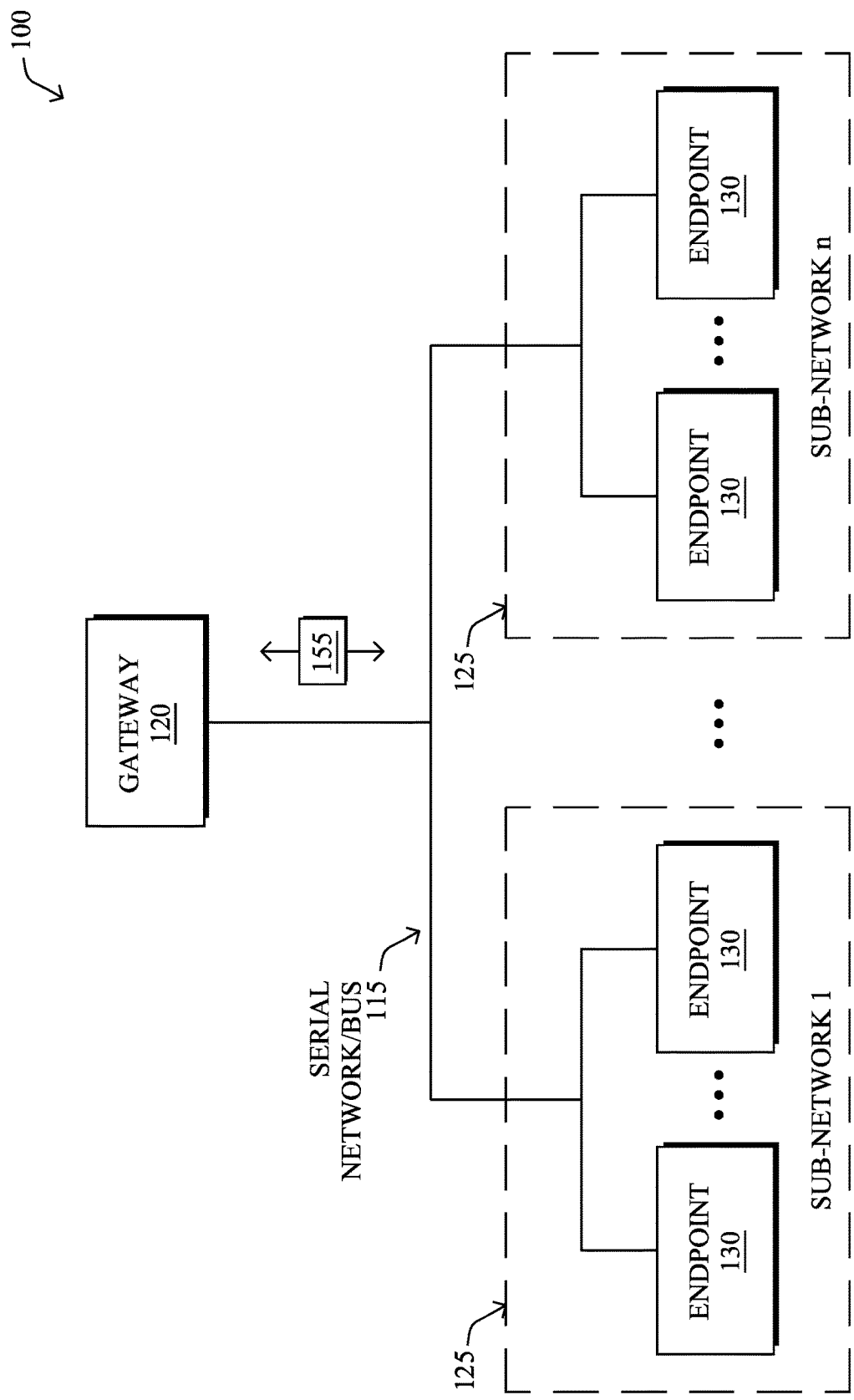

FIG. 1B illustrates one potential implementation of communication system 100, according to various embodiments. As shown, endpoints 130 may be organized into any number of sub-networks 125 of serial network/bus 115 (e.g., a first through nth sub-network). For example, in the case of a vehicle, the engine control system may be on one sub-network 125, the braking system (e.g., an anti-lock braking system, etc.) may be on another sub-network 125, etc. Each of sub-networks 125 may also provide different levels of performance, in some cases. For example, system critical components may be on a 500 kbps sub-network, whereas non-critical components may be on a 250 kbps sub-network. Interconnecting sub-networks 125 may be gateway device 120 and/or any number of gateways that interconnect different sub-networks 125.

Figure 2:
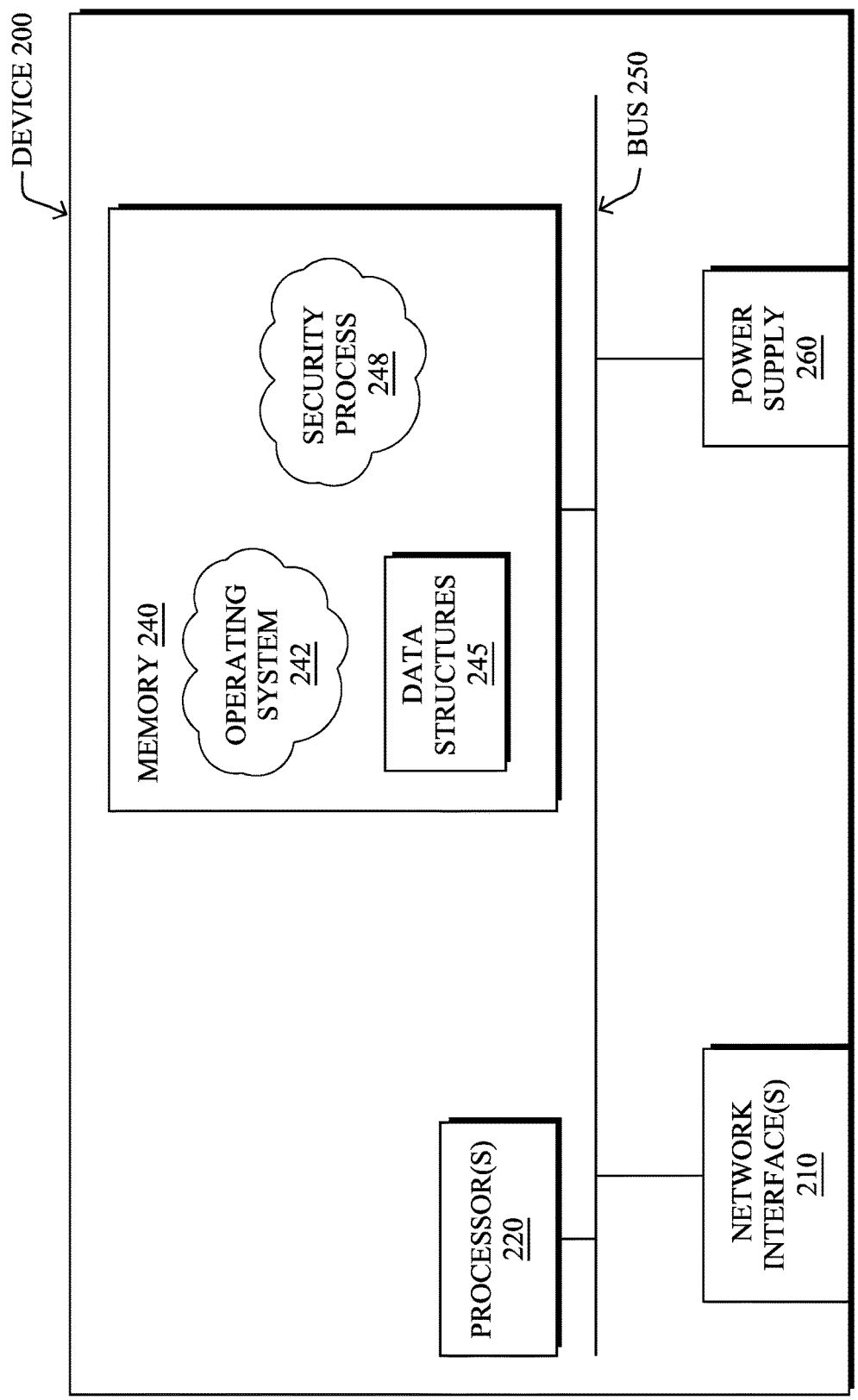
FIG. 2 illustrates an example network device/node.

FIG. 2 is a schematic block diagram of an example node/device 200 that may be used with one or more embodiments described herein, e.g., as any of the nodes/devices shown in FIGS. 1A-1B above, particularly as the gateway device 120 or an endpoint 130, or any of the other nodes/ devices described below (e.g., a head unit in a vehicle, etc.). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

In further embodiments, network interface(s) 210 may include the mechanical, electrical, and signaling circuitry for communicating data over links coupled to the serial network 115. Notably, one or more of network interface(s) 210 may be configured to transmit and/or receive data using a variety of different serial communication protocols, such as OBD, CAN Bus, MODBUS, etc., on any range of serial interfaces such as legacy universal asynchronous receiver/transmitter (UART) serial interfaces and modern serial interfaces like universal serial bus (USB).

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative security process 248, as described herein. Note that while security process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, many serial networks lack a security mechanism to prevent unauthorized devices from joining and participating in the network. Notably, one potential attack on a serial network could involve connecting a malicious device to the network that then creates frames on the serial network that are intended to harm the system. Another potential attack may also leverage an existing device on the serial network by infecting the device with malware. For example, many automotive vehicles are now being increasingly connected via satellite and/or the Internet, thus increasing the potential for malware to infect a device of the vehicle. However, in contrast to many other forms of networks (e.g., traditional IP networks, etc.), the devices on a serial network typically have limited computational abilities, preventing traditional security mechanisms from being implemented in many serial networks.

Data Security Inspection Mechanism for Serial Networks

The techniques herein provide a simple, computationally efficient solution to detect new and/or malicious devices in a serial network. In some aspects, the techniques herein can be performed in whole, or in part, by a low power serial device, such as a CAN Bus gateway. In further aspects, the techniques herein provide a security methodology that leverages a combination of message content and inter-message delays, to identify malicious devices with a high degree of accuracy. A further aspect of the techniques herein introduces rules-based analytics of the events in the Head Unit of a vehicle, which is typically a more powerful device than a CAN Bus gateway, to improve the accuracy of detection (e.g., by reducing false positives).

Specifically, according to one or more embodiments of the disclosure as described in detail below, a device in a serial network determines that a suspicious event has occurred in the network. The suspicious event is identified based on timing information for one or more frames in the serial network. The device assesses whether the suspicious event is malicious by evaluating a sequence of events in the network that precede the suspicious event. The device causes a mitigation action to be performed in the network when the suspicious event is deemed malicious.

Illustratively, the techniques described herein may be performed by hardware, software, and/or firmware, such as in accordance with the security process 248, which is may include computer executable instructions executed by the processor 220 (or independent processor of interfaces 210) to perform functions relating to the techniques described herein.

Figure 3:
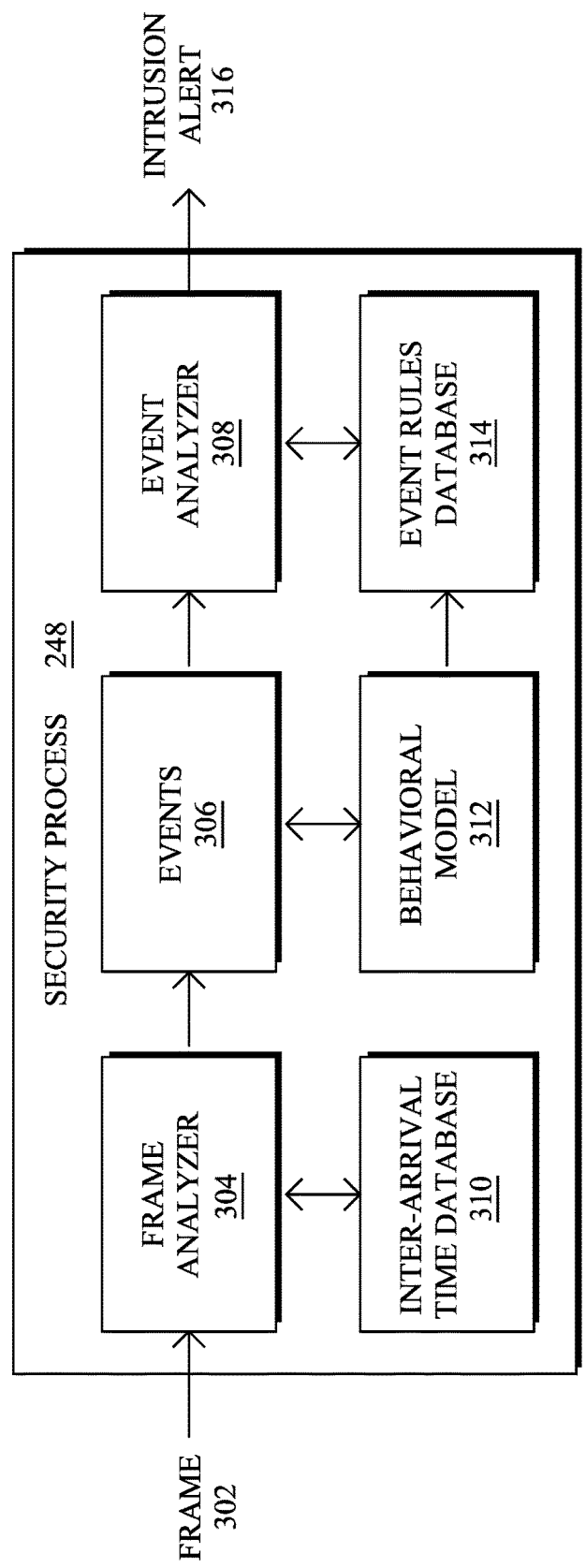
FIG. 3 illustrates an example architecture for evaluating serial network frames.

Operationally, FIG. 3 illustrates an example architecture 300 for evaluating serial network frames, according to various embodiments. As shown, security process 248 may include any number of sub-processes and/or may access any number of memory locations. As would be appreciated, these sub-processes and/or memory locations may be located on the same device (e.g., a device 200) or implemented in a distributed manner across multiple devices, the combination of which may be viewed as a single system/device that executes security process 248. Further, while certain functionalities are described with respect to the sub-processes and memory locations, these functions can be added, removed, or combined as desire, in further implementations.

A key insight into serial network communications that security process 248 may leverage is that all communications are broadcast onto the network/bus and that are accessible to all other devices on the network/bus. Further, in a typical CAN Bus implementation, the central gateway segments the CAN network into multiple sub-network, akin to a subnet, and controls transmissions between the sub-networks. The central gateway also knows the devices/nodes connected to each sub-network apriori. Additional knowledge about the network may be available from the manufacturer, which may have insight into the data patterns and timing of the messages on a per device basis and for each sub-network.

During operation, security process 248 may receive and assess one or more frame(s) 302 that are broadcast onto the serial network/bus. Notably, as shown, security process 248 may execute a frame analyzer sub-process 304 that is configured to discern between normal and suspicious events in the serial network/bus based on the received frame(s) 302. For example, a typical intruding device may send REQUEST frames on the serial network/bus in an attempt to gather critical information from the serial network/bus. Another form of malicious behavior may be that the device sends DATA frames, in an attempt to inject malicious data into the serial network/bus.

In various embodiments, frame analyzer 304 may discern between normal and suspicious (e.g., potentially malicious) events in the serial network/bus by tracking the inter-arrival times and/or the number of REQUEST frames for each device. For example, the central gateway device in a CAN Bus may execute frame analyzer 304, to determine whether the inter-arrival time of frame 302 is within an expected range. In some embodiments, frame analyzer 304 may query an inter-arrival time database 310 that stores expected inter-arrival time signatures for various devices in the serial network system. Inter-arrival time database 310 may store timing information known to the manufacturer of the system (e.g., a vehicle manufacturer, etc.). Frame analyzer 304 may assess not only the inter-arrival time signatures for the incoming frame(s) 302, but also the timing of the messages from time $T_0$ (or boot up instant), to ensure that signatures match that in the inter-arrival time database 310.

While the inter-arrival times of certain serial network/bus messages may be indicative of maliciousness, not all messages will follow a known or expected pattern. For example, frames in a CAN Bus that are associated with user activity may occur sporadically and without any predictable pattern (e.g., the user activates a turn signal indicator, the user presses the brake pedal, etc.). Thus, the signature comparison with $T_0$ information from the inter-arrival time database 310 may not be applicable, as the user input cannot be determined apriori. In such situations, frame analyzer 304 may assess the duration of message sequence itself (e.g., from the start of the message sequence to the end of the sequence) and compare this duration to known signatures in the inter-arrival time database 310. Like the inter-arrival times in the inter-arrival time database 310, these durations are typically readily available from the system manufacturers.

Based on the above analysis, frame analyzer 304 may output events 306 that are labeled as suspicious and/or benign. For example, if a given message sequence takes far longer than expected, this may be an indication that the message sequence is malicious. However, the above approach may also lead to false positives, depending on the signature design. In particular, while the signatures in the inter-arrival time database 310 are generally identifiable by a system manufacturer, the resulting signatures may not be perfectly accurate, particularly in the case of user-related activities, thus leading to false positives.

In various embodiments, security process 248 may also include a number of functions to reduce the number of false positives from frame analyzer 302. As shown, assume that frame analyzer 302 generates and flags certain events 306 as suspicious, based on the analyzed frame(s) 302. In such cases, an event analyzer 308 may review the events 306 deemed suspicious by frame analyzer 304, to determine whether a given frame or event is indeed malicious.

During operation, event analyzer 308 may leverage an event rules database 314, to compare an event 306 deemed suspicious with other events occurring in the other portions of the serial network (e.g., in other sub-networks, etc.). In various embodiments, event rules database 314 may include complex event rules regarding event sequences that may cause frame analyzer 304 to identify a given event 306 as suspicious. The rules in event rule database 314 may be generated by Data in Motion from Cisco Systems, Inc.™, which is able to dynamically create an modify event rules by performing first-order analysis of data, although other rule generation mechanisms may be used in other implementations. For example, event rules database 314 may specify that if events A, B, and C precede an event D that is deemed suspicious by frame analyzer 304, then event D is benign.

In some embodiments, security process 248 may also maintain one or more behavioral model 312 that enhance the determinations by event analyzer 308. Generally, behavioral model(s) 312 may capture complex events based on information such as geography, driving style, model of vehicle, driving conditions, or any other information that may be used to predict a sequence of events. Such model(s) 312 may then be used to refine the event rules in database 314. By way of example, consider the case of two vehicles with similar histories of use. In such cases, they would be expected to produce similar models 312, which can be used to further enhance event rules database 314 (e.g., by distinguishing between expected sets of events from those that are anomalous. Further embodiments, provide for the use of machine learning, to generate and adjust model(s) 312 and/or event rules database 314.

If event analyzer 308 determines that a given suspicious event 306 is indeed malicious, event analyzer 308 may cause any number of mitigation actions to be taken in the serial network by generating and sending an intrusion alert 316 to one or more devices in the network. Generally, intrusion alert 316 may identify the device that sent the frame(s) that were deemed malicious by event analyzer 308. For example, intrusion alert 316 may be sent to a user interface (e.g., a display, a speaker, etc.), to alert a user of the system to the detected malicious traffic from a given device. In another example, intrusion alert 316 may cause the malicious frames and/or any other frames in the serial network to be blocked or otherwise prevented from affecting the operations of the system.

Figure 4:
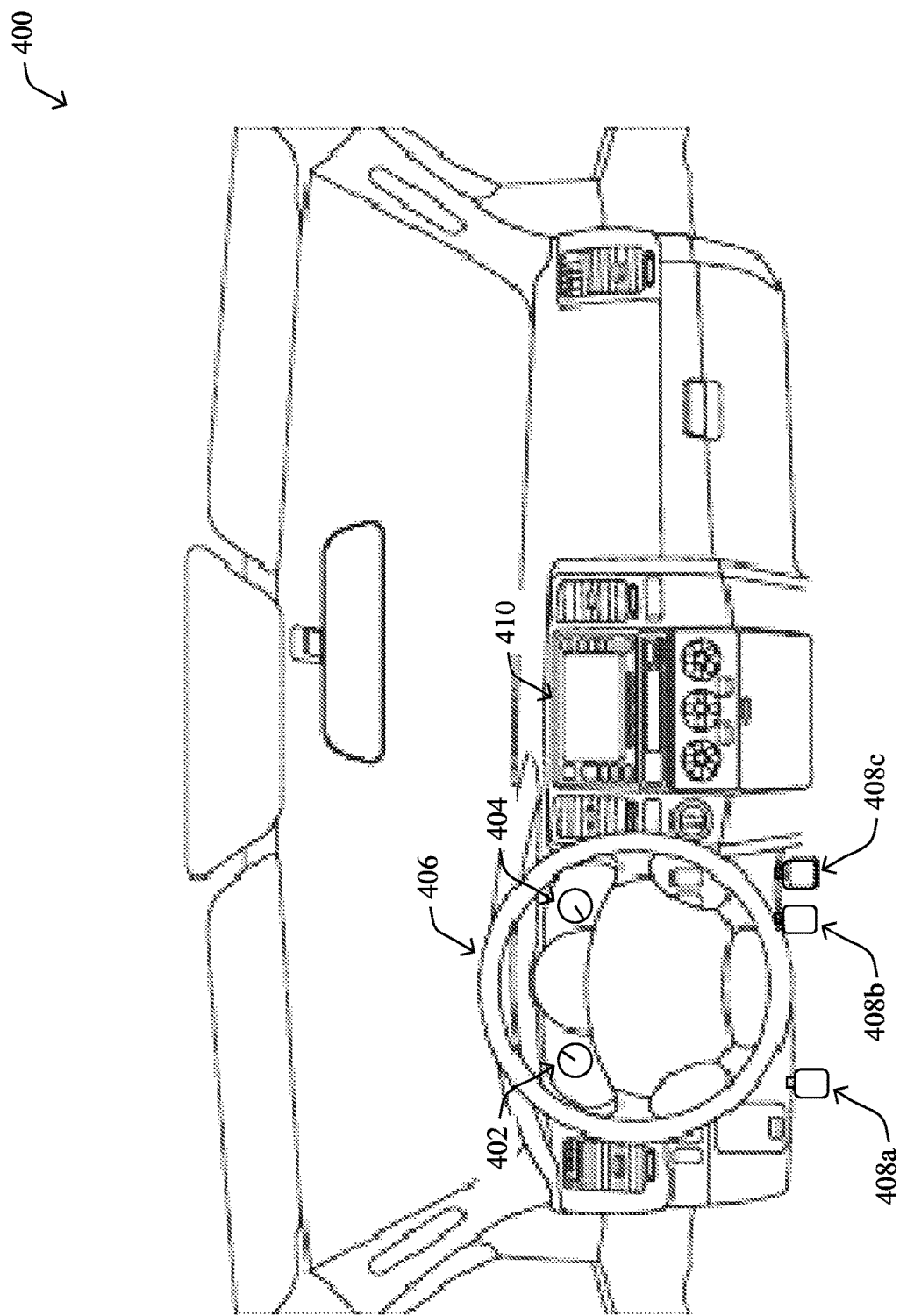
FIG. 4 illustrates example components of a vehicle.

FIG. 4 illustrates example components of a vehicle 400, according to various embodiments. As noted above, many vehicles use a serial network/bus to connect the various components of the vehicle. For example, as shown, gauges 402-404 may be endpoints (e.g., endpoints 130) on the serial network/bus 115 that receive sensed or computed data from other components (e.g., speed information, tachometry information, etc.). Similarly, there may be any number of components that are actuated by a user, thereby resulting in frames being posted to the serial network/bus. For example, the vehicle may include a steering wheel, a number of pedals (e.g., pedals 408a-408c), a head unit 410 (e.g., a deck), etc.

Generally, head unit 410 may control the entertainment and/or navigation features of vehicle 400. For example, head unit 410 may control the speaker system, radio, compact disc, Bluetooth™ interface, video player, or the like. Further, head unit 410 may control a Global Positioning System (GPS) receiver to display navigation data to the users of vehicle 400. As would be appreciated, the head unit in many vehicles typically has the greatest computational capabilities in the vehicle, to perform all of its various functions.

Figure 5A:
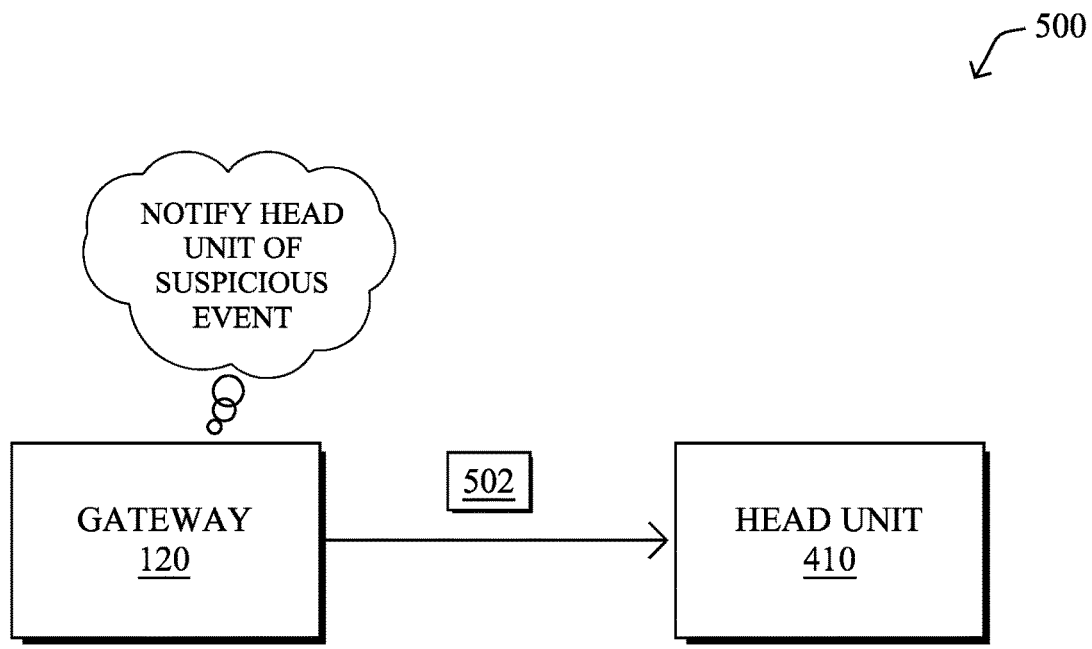
FIGS. 5A-5B illustrate examples of detecting malicious frames in a serial network.
Figure 5B:
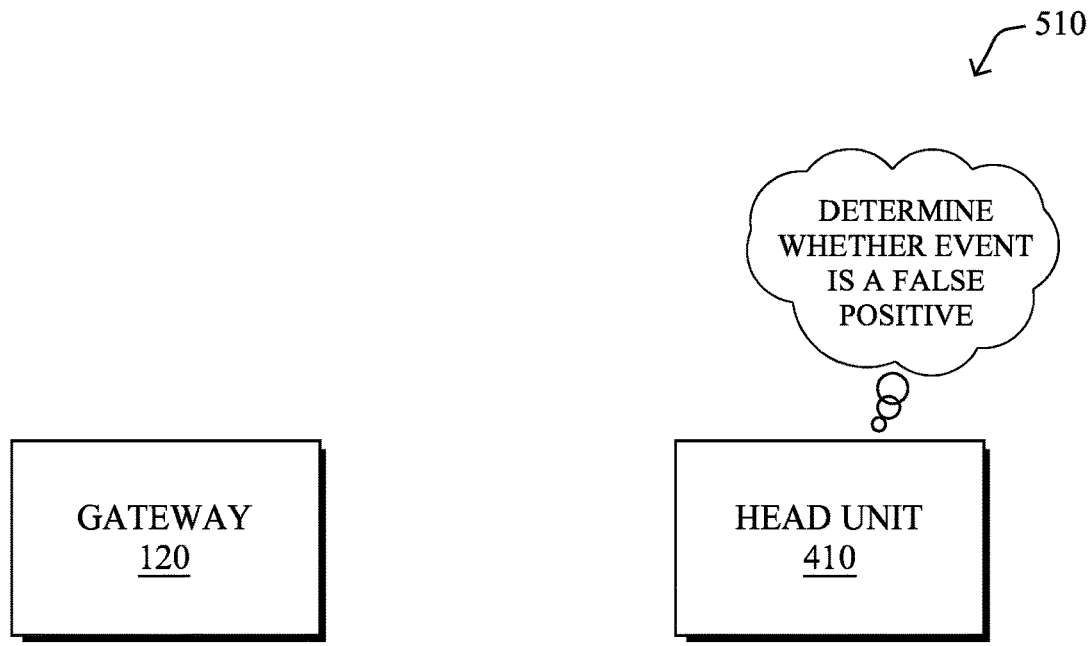

FIGS. 5A-5B illustrate examples of detecting malicious frames in a serial network/bus, according to various embodiments. In certain embodiments, the techniques herein can be implemented in a vehicle in a distributed manner. For example, the techniques herein may leverage the additional computational capabilities of head unit 410. In particular, assume that gateway device 120 is configured to assess frames on the various sub-networks of the vehicle and determine whether an event in the serial network/bus is suspicious. Typically, an intrusion would happen over physically accessible areas of the vehicle, such as an OBD port, and the intruder would try to access more critical devices, such as the transmission/braking system/engine systems.

Based on the detection of any potential intrusion into the serial network/bus, gateway device 120 may provide feedback 502 to head unit 410 for further confirmation of the potentially malicious frames/endpoint, as shown in FIG. 5A. In turn, as shown in FIG. 5B, head unit 410 may apply more advanced analytics, such as by assessing other network events preceding, and/or occurring in conjunction with, the event deemed suspicious by gateway device 120. Using these event rules and/or behavioral model(s), head unit 410 is better able to determine whether the suspicious event from gateway device 120 is a false positive. If not, head unit 410 may then initiate any number of mitigation actions (e.g., by displaying an unauthorized device warning to the user, by blocking or segregating traffic associated with the source of the malicious frames, etc.).

Figure 6:
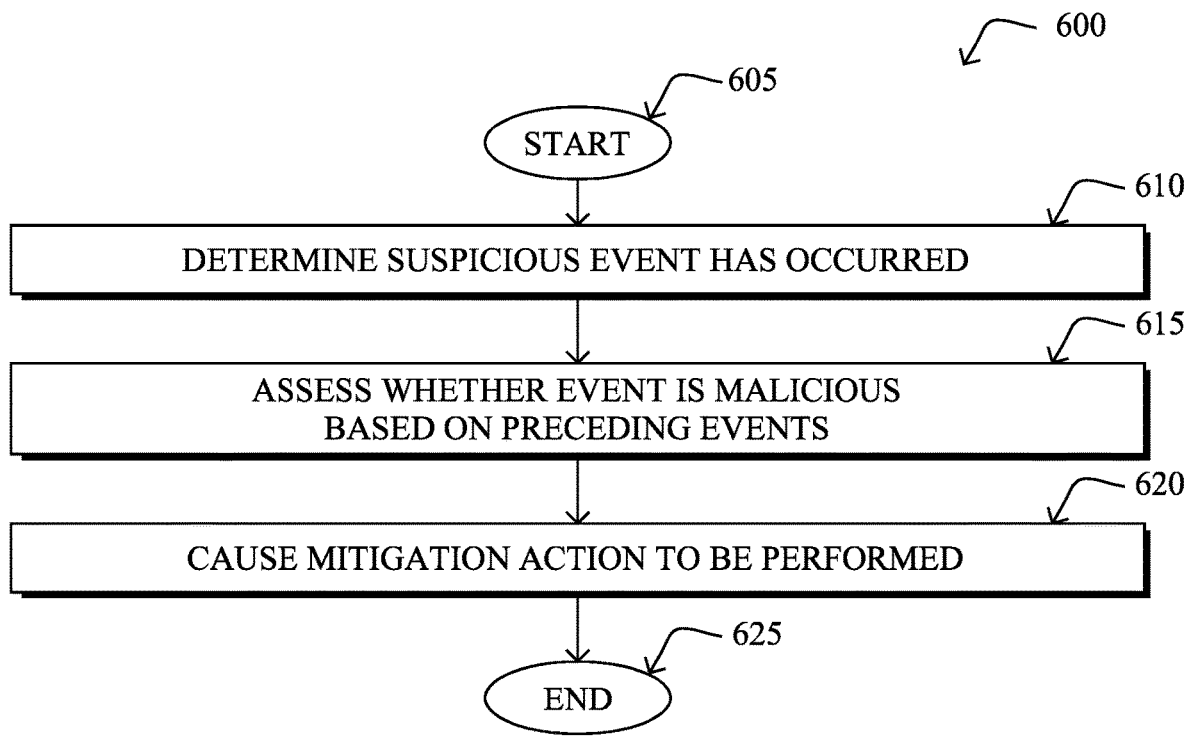
FIG. 6 illustrates an example simplified procedure for performing a security inspection of serial network frames.

FIG. 6 illustrates an example simplified procedure for performing a security inspection of serial network frames, in accordance with one or more embodiments described herein. For example, a non-generic, specifically configured device (e.g., device 200) may perform procedure 600 by executing stored instructions (e.g., process 248). The procedure 400 may start at step 605, and continues to step 610, where, as described in greater detail above, the device may determine that a suspicious event has occurred in a serial network, based on timing information for one or more frames in the serial network. In some embodiments, the device itself may identify the suspicious event itself (e.g., by analyzing the one or more frames). In other embodiments, the device may determine that the event is suspicious based on a notification from another device that performs the identification. For example, in some embodiments, the device may be a head unit in a vehicle that receives an indication of the suspicious event from a CAN Bus or other serial network gateway in the vehicle.

At step 615, as detailed above, the device may assess whether the event is malicious by evaluating a sequence of events leading up to the suspicious event. For example, the root cause of some suspicious events may be a user performing an activity, thereby setting off a chain of network events (e.g., the user actuates a brake pedal, thereby triggering skid sensors and an anti-lock brake system to engage, etc.).

At step 620, the device may cause a mitigation action to be performed in the network when the suspicious event is deemed malicious, as described in greater detail above. For example, the device may generate an alert regarding the event (e.g., to alert a user via a user interface) and/or cause frames associated with the malicious event to be blocked in the serial network (e.g., by quarantining the endpoint to a sub-network, etc.).

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a two part approach to performing data security inspections in a serial network, such as a CAN Bus network, by flagging suspicious events and attempting to reduce false positives using more complex analysis. The techniques are also easily implemented on constrained devices, such as a serial network gateway, by leveraging a more capable device (e.g., a head unit), to perform the more complex analysis of suspicious events detected by a constrained device.

While there have been shown and described illustrative embodiments that provide for a data security inspection mechanism for data security inspection in a serial network, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   tracking, by a device in a serial network that is a controller area network (CAN) bus network, timing information associated with an inter-arrival time and a number of frames from each device in the serial network in a database;
   determining, by the device in the serial network, that a suspicious event has occurred in the serial network, wherein the suspicious event is identified based on whether the inter-arrival time of one or more frames from a particular device in the serial network is within an expected range;
   assessing, by the device, whether the suspicious event is malicious by evaluating a sequence of events in the serial network that precede the suspicious event, wherein the sequence of events a) specify an order of events that are expected to precede an event for the particular device and b) is determined based on a first-order analysis of data in the CAN bus network; and
   causing, by the device, a mitigation action to be performed in the serial network when the suspicious event is deemed malicious.

2. The method as in claim 1, wherein the mitigation action comprises at least one of: generating an alert regarding the suspicious event or blocking the one or more frames in the serial network associated with the suspicious event.

3. The method as in claim 1, wherein determining that the suspicious event has occurred comprises:
   detecting, by the device, the one or more frames in the serial network; and
   computing, by the device, the timing information for the one or more frames in the serial network.

4. The method as in claim 1, wherein determining that the suspicious event has occurred comprises:
   receiving, at the device, an indication from a gateway in the serial network that the suspicious event is suspicious.

5. The method as in claim 4, wherein the device is a head unit in a vehicle.

6. The method as in claim 1, wherein assessing whether the suspicious event is malicious by evaluating a sequence of events in the serial network that precede the suspicious event comprises:
 using, by the device, a behavioral model to evaluate the sequence of events.

7. The method as in claim 6, wherein the behavioral model is trained to detect frames in the serial network associated with user activity.

8. An apparatus, comprising:
 one or more network interfaces to communicate with a serial network that is a controller area network (CAN) bus network;
 a processor coupled to the one or more network interfaces and configured to execute a process; and
 a memory configured to store the process executable by the processor, the process when executed configured to:
  track timing information associated with an inter-arrival time and a number of frames from each device in the serial network in a database;
  determine that a suspicious event has occurred in the serial network, wherein the suspicious event is identified based on whether the inter-arrival time of one or more frames from a particular device in the serial network is within an expected range;
  assess whether the suspicious event is malicious by evaluating a sequence of events in the serial network that precede the suspicious event, wherein the sequence of events specify a) an order of events that are expected to precede an event for the particular device and b) is determined based on a first-order analysis of data in the CAN bus network; and
  cause a mitigation action to be performed in the serial network when the suspicious event is deemed malicious.

9. The apparatus as in claim 8, wherein the mitigation action comprises at least one of: generating an alert regarding the suspicious event or blocking one or more frames in the serial network associated with the suspicious event.

10. The apparatus as in claim 8, wherein the apparatus determines that the suspicious event has occurred by:
 detecting the one or more frames in the serial network; and
 computing the timing information for the one or more frames in the serial network.

11. The apparatus as in claim 8, wherein the apparatus determines that the suspicious event has occurred by:
 receiving an indication from a gateway in the serial network that the suspicious event is suspicious.

12. The apparatus as in claim 11, wherein the apparatus is a head unit in a vehicle.

13. The apparatus as in claim 8, wherein the process when executed is further configured to:
 use a behavioral model to evaluate the sequence of events.

14. The apparatus as in claim 13, wherein the behavioral model is trained to detect frames in the serial network associated with user activity.

15. A tangible, non-transitory, computer-readable medium storing program instructions that, when executed by a device in a serial network that is a controller area network (CAN) bus network, cause the device to perform a process comprising:
 tracking, by the device, timing information associated with an inter-arrival time and a number of frames from each device in the serial network in a database;
 determining, by the device, that a suspicious event has occurred in the serial network, wherein the suspicious event is identified based on whether the inter-arrival time of one or more frames from a particular device in the serial network is within an expected range;
 assessing, by the device, whether the suspicious event is malicious by evaluating a sequence of events in the serial network that precede the suspicious event, wherein the sequence of events a) specify an order of events that are expected to precede an event for the particular device and b) is determined based on a first-order analysis of data in the CAN bus network; and
 causing, by the device, a mitigation action to be performed in the serial network when the suspicious event is deemed malicious.

16. The computer-readable medium as in claim 15, wherein determining that the suspicious event has occurred comprises:
 receiving, at the device, an indication from a gateway in the serial network that the suspicious event is suspicious.

17. The computer-readable medium as in claim 16, wherein the device is a head unit in a vehicle.

* * * * *

UNITED STATES PATENT AND TRADEMARK OFFICE
CERTIFICATE OF CORRECTION

PATENT NO. : 10,666,671 B2
APPLICATION NO. : 15/497806
DATED : May 26, 2020
INVENTOR(S) : David A. Maluf et al.

Page 1 of 1

It is certified that error appears in the above-identified patent and that said Letters Patent is hereby corrected as shown below:

In the Specification

Column 4, Line 20, please amend as shown:
in accordance with the security process 248, which may Signed and Sealed this
Eighteenth Day of August, 2020

Andrei Iancu
*Director of the United States Patent and Trademark Office*